(12) United States Patent
Mehrotra et al.

(10) Patent No.: US 12,688,057 B1
(45) Date of Patent: Jul. 21, 2026

(54) LOCAL COMPUTING RESOURCE CREATION FOR PERFORMING MACHINE LEARNING TASKS

(71) Applicant: Amazon Technologies, Inc., Seattle, WA (US)

(72) Inventors: Prateek Mehrotra, Bothell, WA (US); Mufaddal Taher Rohawala, Seattle, WA (US); Owen Thomas, Seattle, WA (US); Haja Maideen Mohamed Thajudeen, North Bend, WA (US); George Anthony Torres, Portland, OR (US); Kalyani Madhukar Nikure, Lynnwood, WA (US); Clayton Royce Parnell, Decatur, GA (US); Ling Hoi Wong, Seattle, WA (US); Shweta Singh, Kirkland, WA (US); Rekha Seshadrinathan, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 18/345,874

(22) Filed: Jun. 30, 2023

(51) Int. Cl.
*G06F 9/455* (2018.01)

(52) U.S. Cl.
CPC ................... *G06F 9/45558* (2013.01); *G06F 2009/45562* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 10,282,229 | B2 * | 5/2019 | Wagner | G06F 9/5038 |
| 10,516,607 | B2 | 12/2019 | Melander et al. | |
| 10,761,911 | B2 | 9/2020 | Gupta et al. | |
| 12,456,187 | B2 * | 10/2025 | Wang | G06N 3/0464 |
| 2016/0330073 | A1 * | 11/2016 | Li | G06F 21/53 |
| 2021/0271489 | A1 | 9/2021 | Singhal | |
| 2022/0172111 | A1 * | 6/2022 | Gao | G06N 20/00 |
| 2023/0017799 | A1 * | 1/2023 | Juelich | G06F 16/162 |
| 2024/0289154 | A1 * | 8/2024 | Babiychuk | G06F 9/45558 |

FOREIGN PATENT DOCUMENTS

| | | | | |
|---|---|---|---|---|
| CN | 110308986 A | * | 10/2019 | H04L 67/34 |

OTHER PUBLICATIONS

Mujkanovic et al., Optimising AI Training Deployments using Graph Compilers and Containers, 2020, IEEE High Performance Extreme Computing Conference (HPEC), p. 1-8 (Year: 2020).*

* cited by examiner

*Primary Examiner* — Bradley A Teets
*Assistant Examiner* — Melissa A Headly
(74) *Attorney, Agent, or Firm* — S. Scott Foster; Kowert, Hood, Munyon, Rankin & Goetzel, P.C.

(57) ABSTRACT

Local computing resources may be created for machine learning tasks. A kernel of a machine learning development environment implemented as a first container at a host system may execute code to perform a machine learning task that includes a statement that causes a local execution resource to be created at the host system to perform the machine learning task. A second container may be placed as the local execution resource at the host system as a child application at the host system. A network namespace of the first container may be used as the network namespace of the second container, making the second container able to perform network communications with the first container locally on the host system. The second container may (Continued)

perform the machine learning task in accordance with the code.

20 Claims, 10 Drawing Sheets

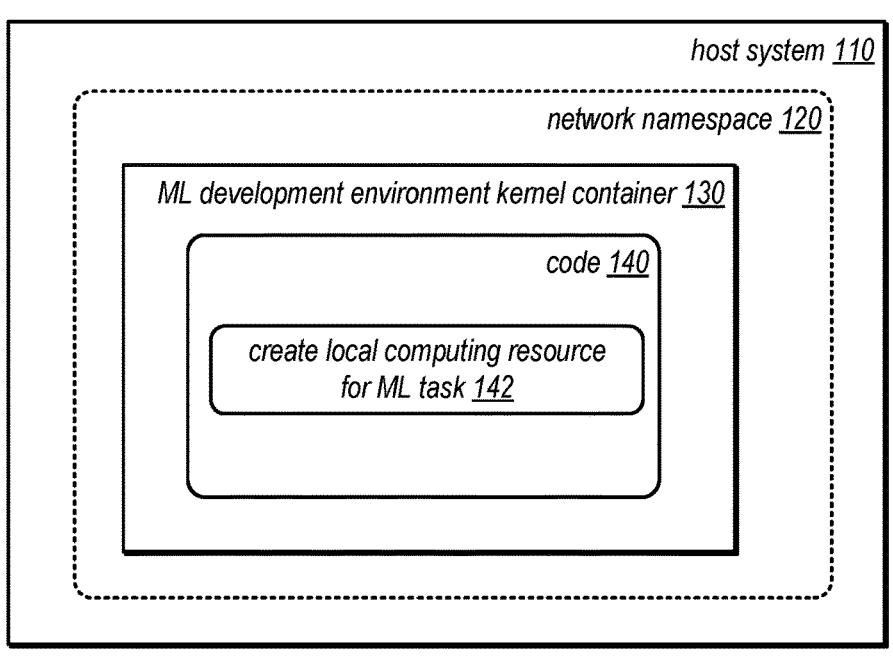
_102_
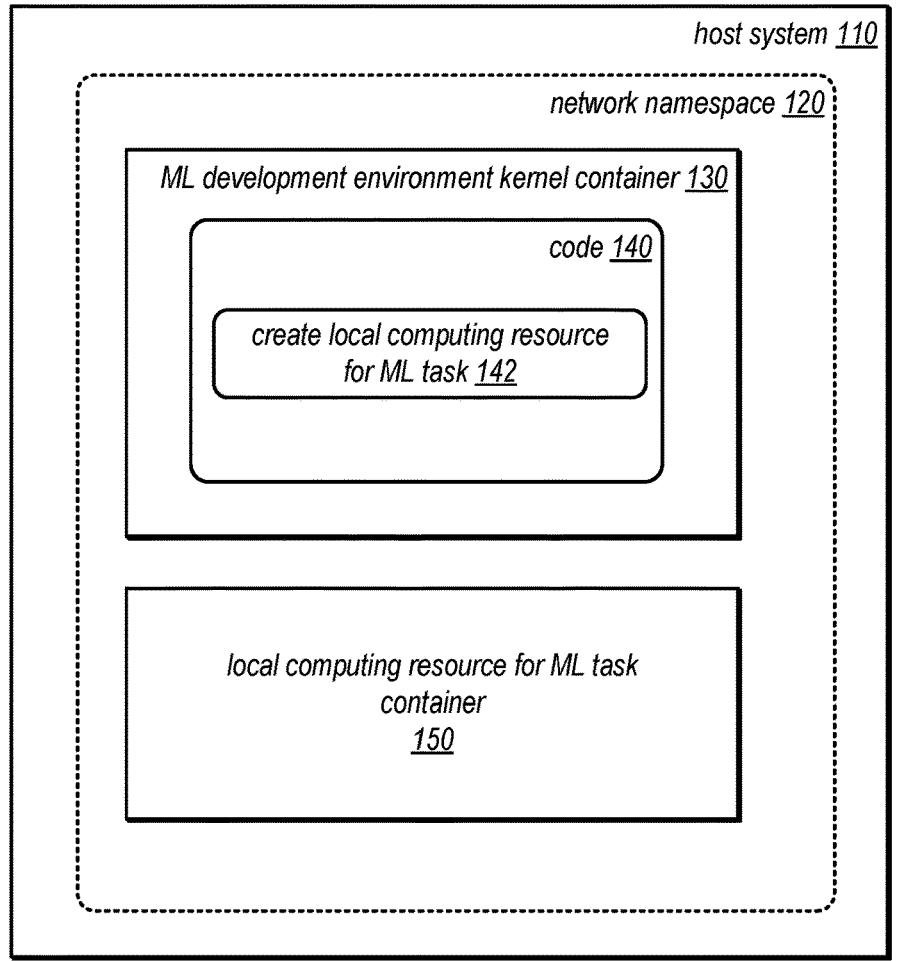
_104_
*FIG. 1*

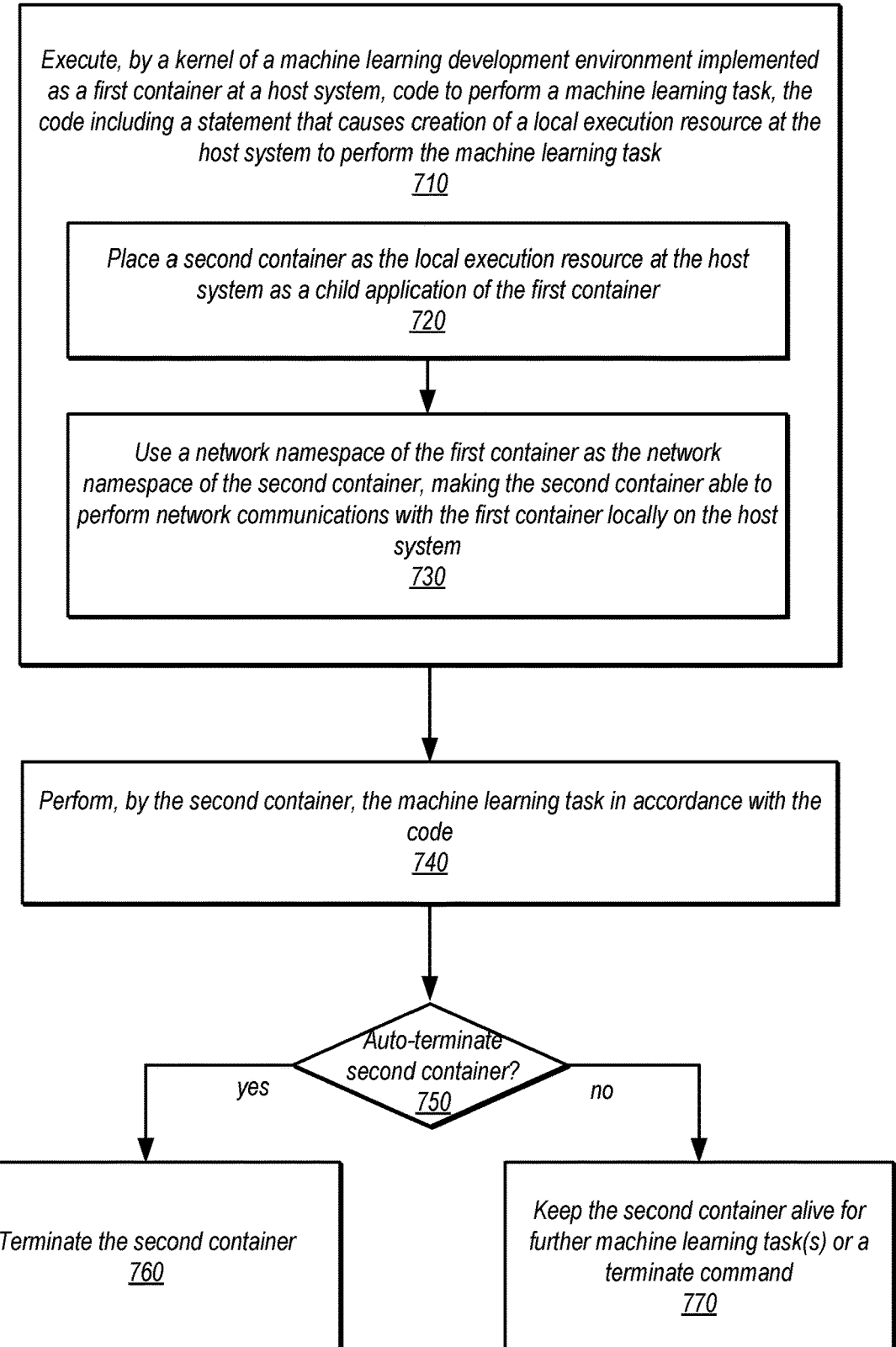

*Execute, by a kernel of a machine learning development environment implemented as a first container at a host system, code to perform a machine learning task, the code including a statement that causes creation of a local execution resource at the host system to perform the machine learning task*
*710*

*Place a second container as the local execution resource at the host system as a child application of the first container*
*720*

*Use a network namespace of the first container as the network namespace of the second container, making the second container able to perform network communications with the first container locally on the host system*
*730*

*Perform, by the second container, the machine learning task in accordance with the code*
*740*

*Auto-terminate second container?*
*750*

*yes*                    *no*

*Terminate the second container*
*760*

*Keep the second container alive for further machine learning task(s) or a terminate command*
*770*

*FIG. 7*

LOCAL COMPUTING RESOURCE CREATION FOR PERFORMING MACHINE LEARNING TASKS

BACKGROUND

Machine-learned models and data-driven systems have been increasingly used to help make decisions in various application domains. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

BRIEF DESCRIPTION OF THE DRAWINGS

FIG. 1 is a logical block diagram that illustrates local computing resource creation for performing machine learning tasks, according to some embodiments.

FIG. 7 is a high-level flowchart illustrating various methods and techniques for local computing resource creation for performing machine learning tasks, according to some embodiments.

Figure 2:
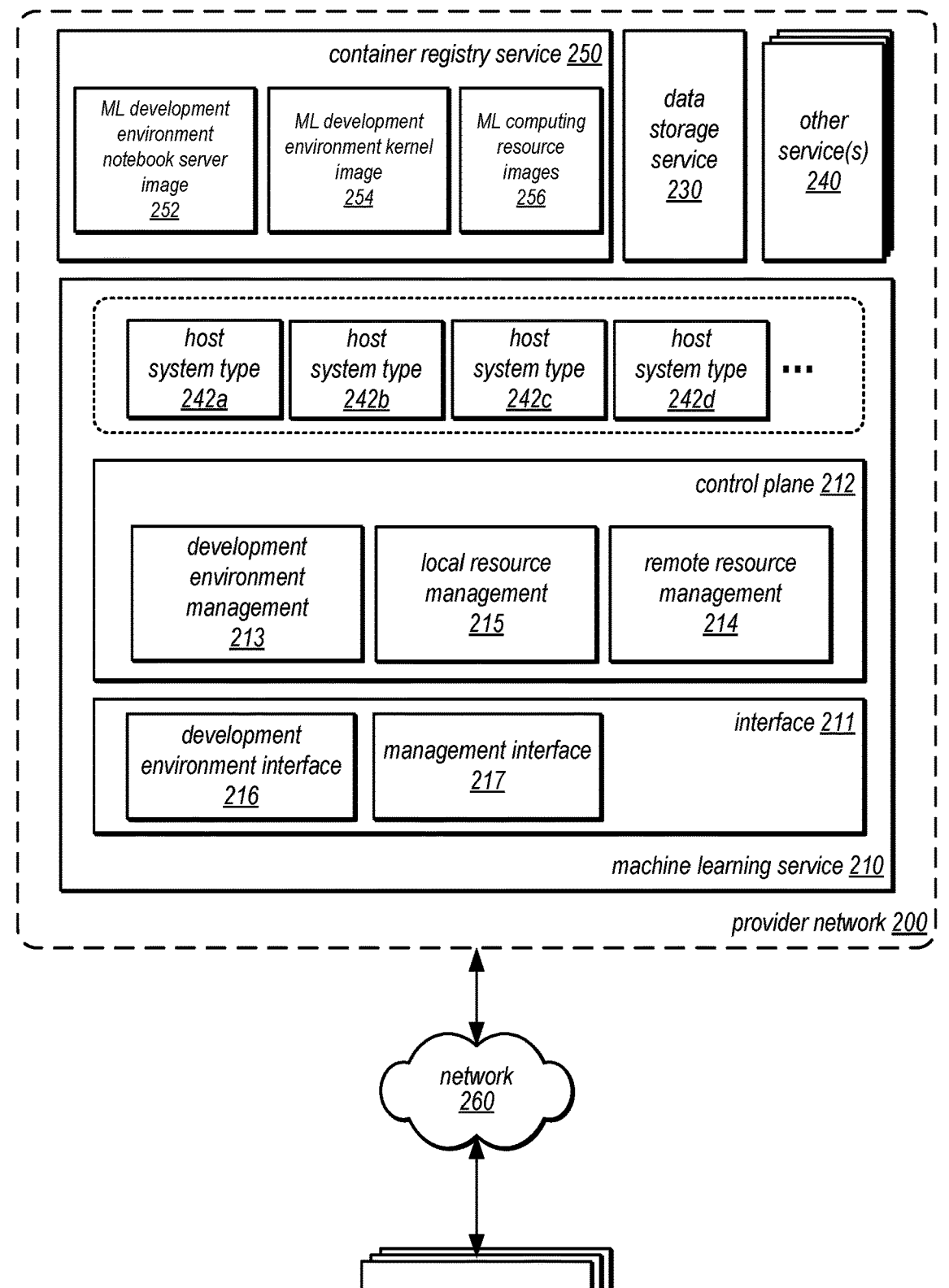
FIG. 2 is a logical block diagram that illustrates an example provider network that may implement a machine learning service that implements local computing resource creation for performing machine learning tasks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for local computing resource creation for performing machine learning tasks are described herein. Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," or a "prediction" during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. Computer vision machine learning models, for example, may be trained using training data sets of image data and may also make inferences to perform various computer vision tasks, such as image classification, object detection, or image regression, among others.

Developing machine learning models through training, validation, and evaluation may be a complex endeavor. Machine learning development environments may be implemented to provide many different frameworks and computing resources for performing such tasks. As development of machine learning models is often an iterative task, flexibility in obtaining and using computing resources may be highly desirable. For example, prior to consuming a large amount of computing resources to perform a training task for a machine learning model, a local computing resource can be used that is collocated with the kernel of the machine learning development environment to mimic the same network behavior and other interactions that would performed if a separate, remote computing resource (e.g., that provides the large amount of computing resources).

In this way, the code to execute the training task can be tested and evaluated using a local computing resource that is more resource efficient without having to significantly change the underlying code for the training task (e.g., because the local computing resource may still operate as if were a remotely accessed over a network even though it is actually collocated with the kernel). In addition to providing an improved transition between local and remote execution environments for machine learning tasks, techniques that implement local computing resource creation for performing machine learning tasks can shorten the amount of time to perform machine learning tasks (e.g., by reducing or eliminating startup time for computing resources as well as utilization or other costs incurred by utilizing remote computing resources).

FIG. 1 is a logical block diagram that illustrates local computing resource creation for performing machine learning tasks, according to some embodiments. In scene 102, host system 110 may implement container virtualization (e.g., operating system virtualization) to host a machine learning (ML) development environment kernel container 130. Host system 110 may be implemented as part of a provider network service, such as machine learning service 210 discussed below with regard to FIGS. 2-6, as virtual compute instance, "bare-metal" server, or other system that can implement container-based virtualization. In some embodiments, host system 110 may be implemented separately from a provider network service (e.g., an on-premise system) or other set of computing resources while still obtaining the performance benefits noted above (e.g., improved transition to remote machine learning task computing resources).

Machine learning development environment kernel container 130 may execute code 140, which are instructions to run various development machine learning tasks, such as training and inference tasks. In various embodiments, code 140 may utilize a library, function, or feature of a software development kit (SDK) (e.g., a set of software tools, programs, or libraries) for machine learning tasks that supports a statement or other invocation to create a local computing resource for a machine learning task, as indicated at 142. In some embodiments, the SDK may be provided by a service, such as machine learning service 210 discussed below with regard to FIG. 2. For example, a "Create Application" application programming interface (API) may be invoked that can specify various features of a machine learning task, including a "local resource type" for executing the machine learning task. This invocation 142 may cause a host system component or external component, such as control plane components as discussed below with regard to FIGS. 5 and 6, to handle the creation of the local computing resource.

For example, as illustrated in scene 104, local computing resource for ML task container may be obtained and launched at host system 110. As indicated by the network namespace boundary 120, local computing resource for ML task container 150 may be co-located such that external network communications are not needed in order to support communications between ML development environment kernel container 130 and local computing resource for ML task container 150. For example, network namespace boundary 120 may be a local, independent network stack, that can implement its own routes, firewall rules, and network devices. As they are local, they may be virtualized routes, firewall. For example, communications may pass to a predetermined port that acts as an endpoint for the local computing resource for ML task container 150. In this way, no additional routing has to be performed (that wouldn't also be performed in a remote computing resource implementation). A network namespace may share the same network features (e.g., networking devices and routing table entries). In this way, the endpoint for the local computing resource for ML task container 150 may be, for example, may utilize another port on the shared networking device to facilitate communications.

Figure 3:
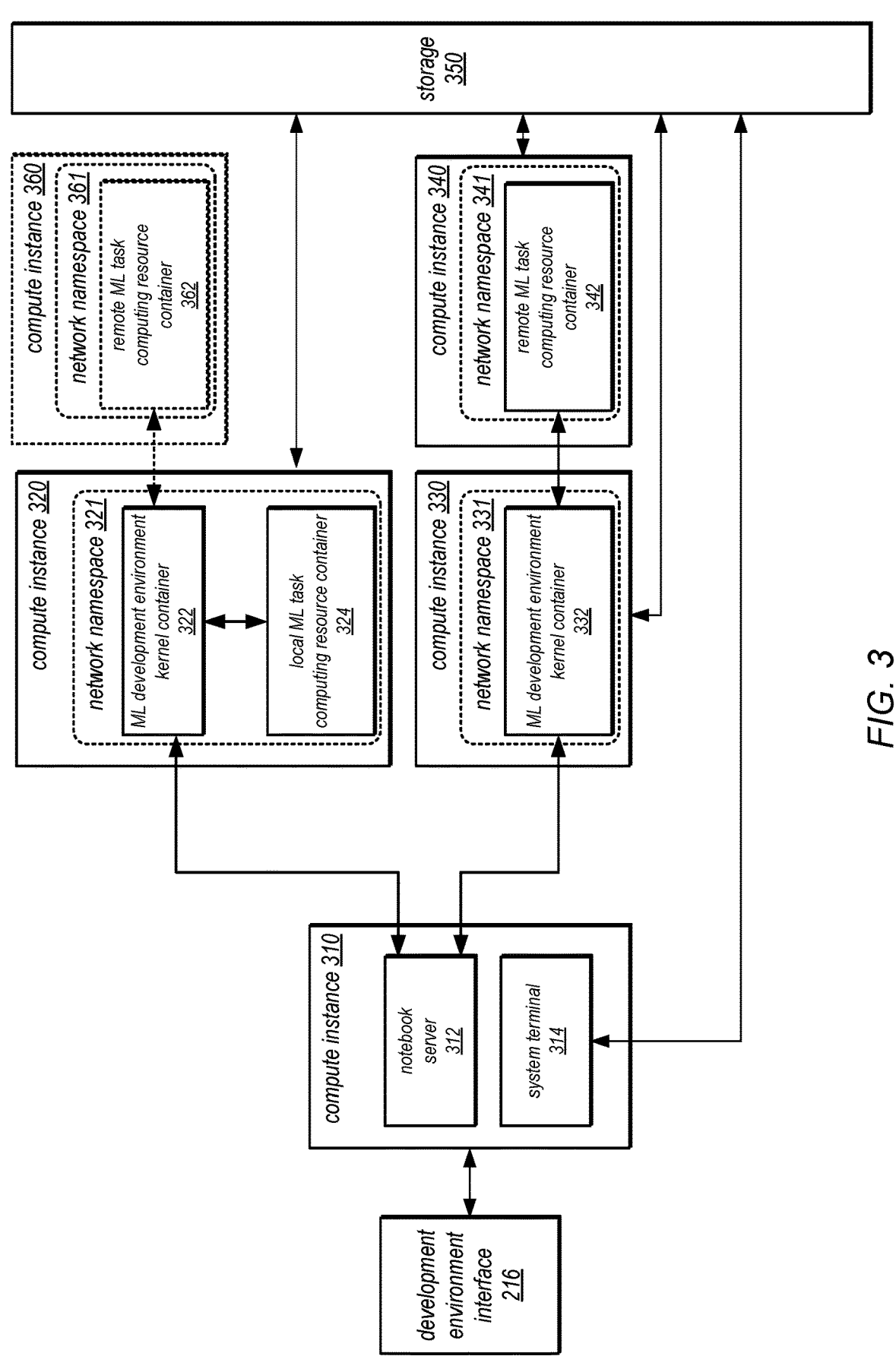
FIG. 3 is a logical block diagram that illustrates interactions between a notebook server and development environment kernel containers using local and remote computing resources, according to some embodiments.

In various embodiments, local computing resource for ML task container 150 may be treated as a child application of ML development environment kernel container 130. For example, as discussed below with regard to FIGS. 8 and 9, health and idle checks for parent or child in the relationship may affect the other application. Although FIG. 1 depicts a single local computing resource, multiple local computing resources may be created for ML development environment kernel container 130. For example, multiple local computing resources (in addition to container 150) for different ML tasks specified in code 140. Further containers may be placed on host system 110 within network namespace 120 in order to ensure local network communication between the containers, providing a local, distributed execution environment. These containers may also have a child relationship with parent container 130 as they also were caused by a statement executed by development environment kernel container 130. Moreover, as depicted in FIG. 3, ML development environment kernel container 130 may also utilize remote computing resources as well.

Please note that the previous description of is a logical illustration of host systems and containers, and thus is not to be construed as limiting as to other embodiments of a machine learning system.

This specification continues with a general description of a provider network that implements multiple different services, including a machine learning service, which may implement local computing resource creation for performing machine learning tasks. Then various examples of, including different components, or arrangements of components that may implement generating machine learning model host system recommendations using local computing resource creation for performing machine learning tasks are discussed. A number of different methods and techniques to implement local computing resource creation for performing machine learning tasks are then discussed, some of which are illustrated in accompanying flowcharts. Finally, a description of an example computing system upon which the various components, modules, systems, devices, and/or nodes may be implemented is provided. Various examples are provided throughout the specification.

FIG. 2 is a logical block diagram that illustrates an example provider network that may implement a machine learning service that implements local computing resource creation for performing machine learning tasks, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and services offered by the provider network 200, in one embodiment. In some embodiments, provider network 200 may implement various computing resources or services, such as machine learning service 210, storage service(s) 230, container registry service 250, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning service 210 may implement interface 211 to allow clients (e.g., client(s) 250 or clients implemented internally within provider network 200, such as a client application hosted on another provider network service like an event driven code execution service or virtual compute service) to train and deploy machine learning models (e.g., neural networks or various other types of machine learning models) via development interface 216 and/or configure or utilize machine learning service 210 through management interface 217. For example, machine learning service 210 may implement interface 211 (e.g., a graphical user interface, programmatic interface that implements Application Program Interfaces (APIs) and/or a command line interface) may be implemented so that a client can submit, edit, or otherwise implement various different model development, deployment, host system recommendation or other management requests. For example, interface 211 may include development and deployment environment interface 216, which may provide a training script or other code editor with various development tools to create, submit, and/or monitor machine learning pipeline with a training job and/or monitoring job, as discussed below. Development and management environment 216 may be a graphical interface, in some embodiments, and may provide an interface to past results generated for other models, in some embodiments. Similarly, management interfaces 217 may provide various graphical user interface features for creating and managing accounts, studio groups, authorizations, or various other features of machine learning service 210.

Machine learning service 210 may implement a control plane 212 to perform various control operations to implement the features of machine learning service 210. For example, control plane may monitor the health and performance of requests at different components, such as training as part of model development, execution of machine learning models as part of model deployment 215. For example, if a node or other component fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

Machine learning service 210 may implement development environment management 213 as part of control plane 212 to develop, configure, program, define, and/or otherwise execute training jobs on various machine learning models using data sets, such as data sets in storage services 230 across one or more host system types 242a, 242b, 242c. 242d, and so on (which may include various configurations, sizes, and numbers of one or more respective processing devices for training, such as GPUs and other hardware (e.g., amount and speed of memory) and/or software capabilities). In some embodiments machine learning service 210 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, a development environment, and executed. Various tests or other development operations for machine learning models may also be performed. In some embodiments, the various files, configuration information, and other data for machine learning model development may be organized as a project (or other collection) and stored, versioned, or otherwise managed by model development environment management 213 (e.g., as a collection of one or more files or data objects in storage services 230).

In various embodiments, machine learning service 210 may implement local resource management 214 and remote resource management 215, which may deploy a machine learning task and/or trained machine learning model on resources of host systems (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of provider network 200 (e.g., a virtual compute service) and then the machine learning model deployed to that provisioned resource along with various software or other applications to support the receipt of requests for inferences and return inferences.

Model host types 242a, 242b, 242c, and 242d, may offer many different configurations of computing resources that can be utilized to host a machine learning model to perform workloads as part of a system, service, or application. In some embodiments, model host types 242 may be implemented or managed directly by machine learning service 210, providing, for example, various virtual computing resources with different hardware and software capabilities for executing machine learning model workloads. In some embodiments, model host types 242 may include other computing resources, such as may be offered by other services 240, such as virtual compute service that offers computing resources as instances (e.g., virtual machines), containers (e.g., operating system-level virtualization), and/or bare-metal systems (e.g., no virtualization). Again, each of these computing resources may have different hardware and software capabilities for executing machine learning model workloads.

Container registry service 250 may store and provide both machine learning service 210 containers (e.g., ML development environment notebook server image 252, ML development environment kernel image 254, and ML computing resource images 256) as well as containers provided by a user, as discussed below with regard to FIG. 4.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may include object or file data stores for putting, updating, and getting data objects or files, in some embodiments, one or more of which may be used for providing data storage to support machine learning service 210 (e.g., as discussed below with regard to FIGS. 3-6). For example, one data storage service 230 may be a file system service, store that allows for different data objects of different formats or types of data as respective file systems associated with an account or user(s) of machine learning service 210. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to start machine learning task execution, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to configure or perform machine learning tasks) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

FIG. 3 is a logical block diagram that illustrates interactions between a notebook server and development environment kernel containers using local and remote computing resources, according to some embodiments. Development environment interface 216 may, in some embodiments, provide a studio or other graphical development interface for users of machine learning service 210. Through network-based requests received via development environment interface 216, a compute instance implementing a notebook server 312 which supports a development or studio domain for multiple users may receive development requests and route them to the appropriate ML development environment kernel container (e.g., specific to a user).

For example, compute instance 320 may be a host system for ML development environment kernel container 322 which may create a local ML task computing resource container 324 (according to the various techniques discussed above and below) in a same network namespace 321 using an image and data from storage service 350. Alternatively (or additionally), a configuration that utilizes a remote computing resource can also be supported. Compute instance 320 could, for instance, also utilize remote compute instance 360 using its own network namespace 361 for remote ML task computing resource container 362. In another example, notebook server 312 may also communicate with compute instance 330 that implements ML development environment kernel container 332 in network namespace 331 and utilizes compute instance 340 to provide a remote ML task computing resource container 342 in network namespace 341. In some embodiments, compute instance 310 may also support system terminal 314 access directly to a file system at storage service 350 for a studio domain.

Figure 4:
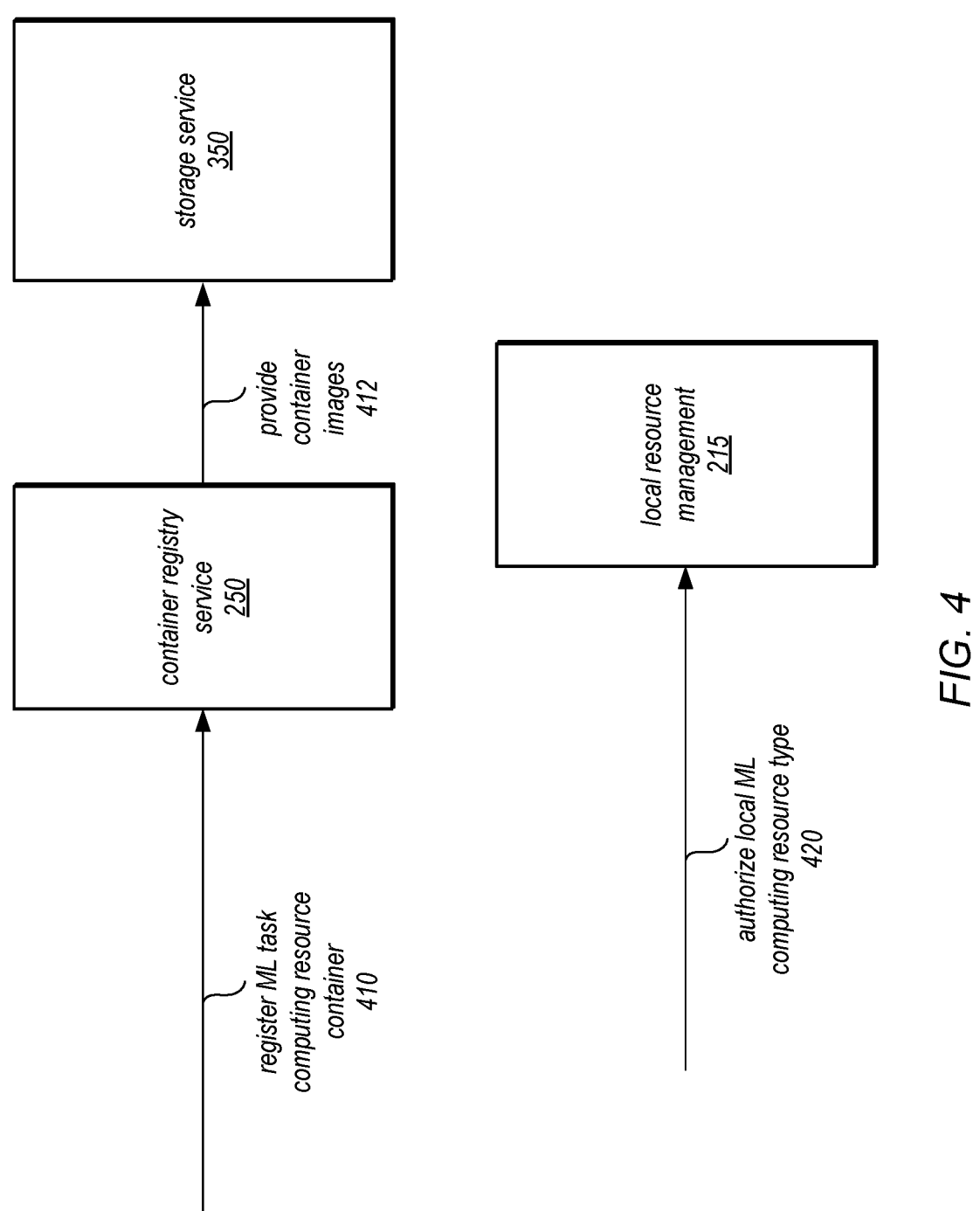
FIG. 4 is a logical block diagram that illustrates interactions to register and authorize containers for locally hosted computing resources, according to some embodiments.

FIG. 4 is a logical block diagram that illustrates interactions to register and authorize containers for locally hosted computing resources, according to some embodiments. In some embodiments, it may be desirable to use custom container images to perform machine learning tasks. In such scenarios, container registry service 250 may accept new ML task computing resource container registration requests 410. For example, registration request 410 may upload, store, identify, or otherwise provide the computing resource container for an ML task. These containers may be stored as images in container registry service 250 and subsequently provided, as indicated at 412 to storage service 350 for a particular user account or associated users with a development environment.

In some embodiments, a request to authorize local ML computing resource types 420 (e.g., for specific users or an entire account) may be sent or otherwise signal to development environment management 213. In this way, when create local requests are received at local resource management 215, validation of the authorization to perform the create local resource request may be performed.

Figure 5:
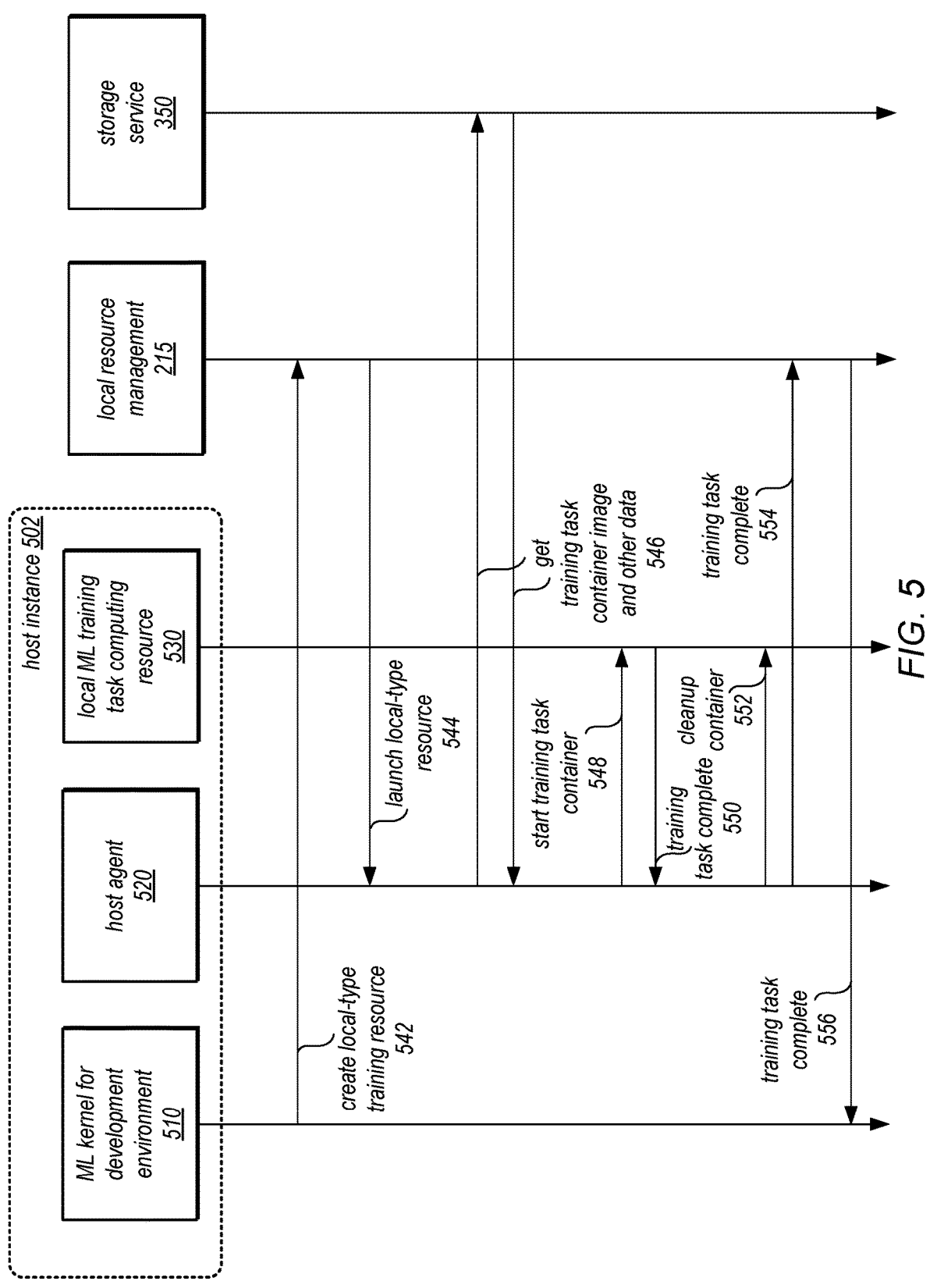
FIG. 5 is a sequence diagram that illustrates creating a local computing resource for performing a training task, according to some embodiments.

FIG. 5 is a sequence diagram that illustrates creating a local computing resource for performing a training task, according to some embodiments. A host instance 502 may implement ML kernel for development environment 510 and host agent 520. Host agent 520 (as well as host agent 620) may be software daemons or other software components executing on host instances that communicate with control plane components, such as local resource management 215 in order to manage operations (e.g., various lifecycle operations on host instance 602, such as the launching otherwise starting different containers, like ML kernel for development environment 510, reporting status or various other performance information and carrying out various other control plane instructed or managed tasks). As part of executing ML task code, ML kernel for development environment 510 may send a create local-type training resource request 542 via an API to local resource management 215. Local resource management 215 may launch a local-type resource 544 by instructing host agent 520. Host agent 520 may get 546 the corresponding training task container image from storage service 350 (as well as various other data, such as bootstrap artifacts that are used to configure, initialize or have the training task operate on) and start 548 the container as local ML training task computing resource 530 at host instance 502. As discussed above with regard to FIGS. 1 and 3 and below with regard to FIG. 7, the same network namespace may be used for local ML training task computing resource 530.

When the training task has completed (e.g., according to stop conditions or criteria), local ML training task computing resource 530 may send a signal that training task is complete, as indicated at 550. Host agent 520 may then clean-up the training task container, as indicated at 552, and signal that that the training task is complete, as indicated 554, to local resource management 215. Local resource management 215 may signal that training task is complete 556 to ML kernel for development environment 510.

Figure 6:
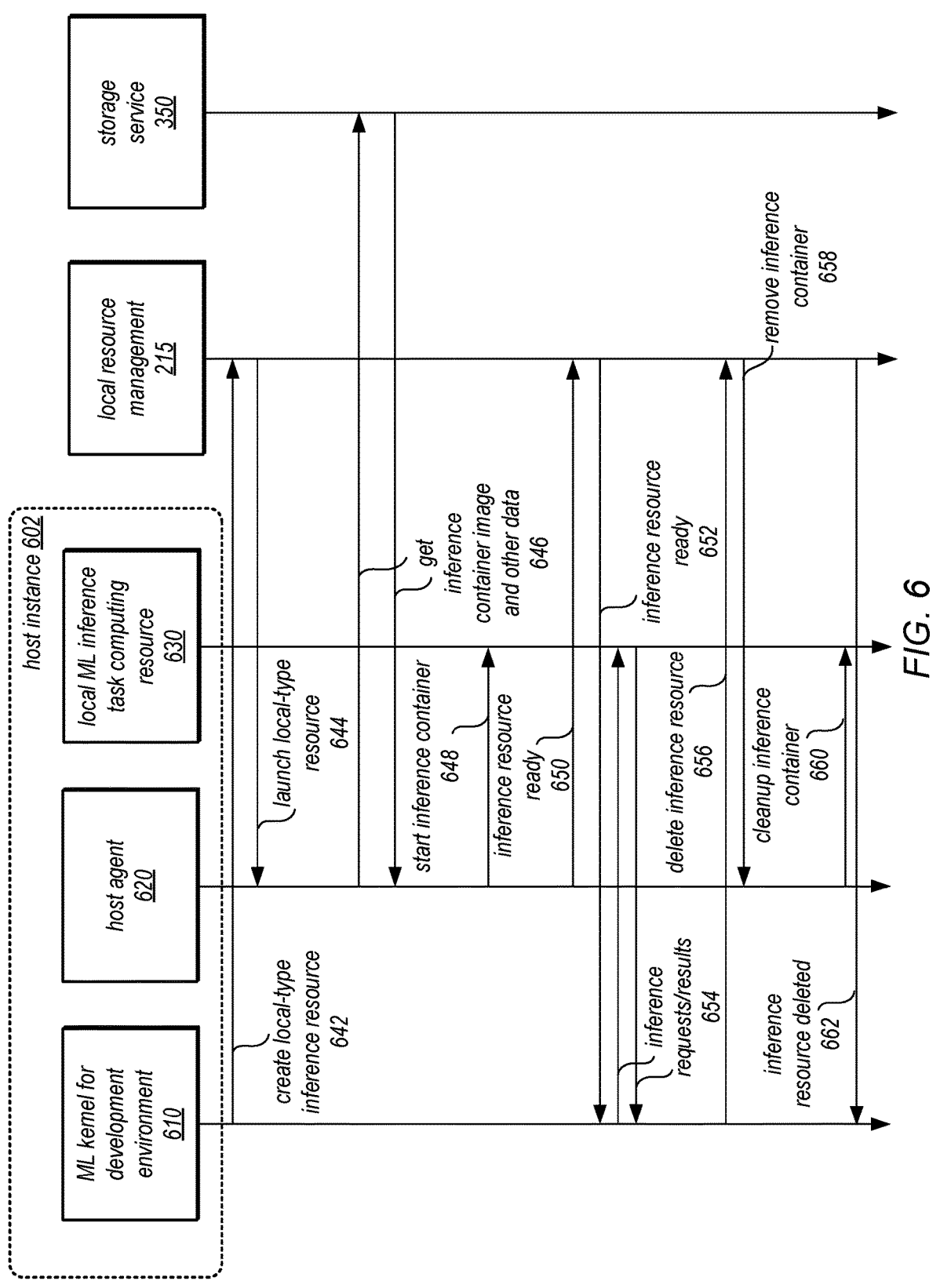
FIG. 6 is a sequence diagram that illustrates creating a local computing resource for performing an inference task, according to some embodiments.

FIG. 6 is a sequence diagram that illustrates creating a local computing resource for performing an inference task, according to some embodiments. A host instance 602 may implement ML kernel for development environment 610 and host agent 620. As part of executing ML task code, ML kernel for development environment 610 may send a create local-type inference resource request 642 via an API to local resource management 215. Local resource management 215 may launch a local-type resource 644 by instructing host agent 620. Host agent 620 may get 646 the corresponding inference container image from storage service 350 (as well as various other data, such as bootstrap artifacts that are used to configure, initialize or have the inference task operate on) and start 648 the container as local ML inference task computing resource 630 at host instance 602. As discussed above with regard to FIGS. 1 and 3 and below with regard to FIG. 7, the same network namespace may be used for local ML inference task computing resource 630.

Host agent 620 may inform local resource management 215 that local ML inference task computing resource 630 is ready, as indicated at 650. This inference ready signal may be passed 652 to ML kernel for development environment 610 which may then send a number of inference requests and receive results, as indicated at 654, from local ML inference task computing resource 630. When ready to terminate, ML kernel for development environment 610 may send a request to delete inference resource, as indicated at 656, to local resource management 215. Local resource management may instruct 658 the host agent 620 to remove the inference container. Host agent 620 may then clean-up the inference container, as indicated at 660, and local resource management 215 may signal that inference resource is deleted 662 to ML kernel for development environment 610.

Although FIGS. 2-6 have been described and illustrated in the context of a provider network implementing a machine learning service, the various components illustrated and described in FIGS. 2-6 may be easily applied to other machine learning systems that can implement local host systems. As such, FIGS. 2-6 are not intended to be limiting as to other embodiments.

FIG. 7 is a high-level flowchart illustrating various methods and techniques for local computing resource creation for performing machine learning tasks, according to some embodiments. As indicated at 710, a kernel of a machine learning development environment implemented as a first container at a host system may execute code to perform a machine learning task, the code including a statement that causes creation of a local execution resource at the host system to perform the machine learning task, in some embodiments. As discussed above with regard to FIG. 1, the code may invoke an API of an SDK or some other feature that causes the creation. As indicated at 720, the creation of the local computing resource may cause a second container as the local execution resource to be placed at the first host system as a child application of the first container, in some embodiments. As indicated at 730, a network namespace of the first container as the network namespace of the second container, making the second container able to perform network communications with the first container locally on the host, in some embodiments.

As indicated at 740, the machine learning task may be performed by the second container in accordance with the code. For example, different machine learning tasks, such as training or inference tasks may be identified and executed by a corresponding container image that is launched as part of placing the local computing resource at the host system. For those containers that do not auto-terminate, the second container may be kept alive for further machine learning tasks(s) or a terminate command (which may be sent as part of executing the code and/or via a command to the kernel for the machine learning development environment, as indicated at 770.

As indicated at 750, some machine learning tasks may cause a second container to auto-terminate. For example, a training task may have a defined stop condition or criteria, which when reached may trigger an auto-termination. In another example, a time to live or other limit on an inference task may be specified and when reached may trigger an auto-termination. For those machine learning tasks that do auto-terminate, the second container may terminate, as indicated at 760. For example, a cleanup process that deactivates, removes, and/or deletes the second container and any application data from the host system may be performed, in some embodiments.

Figure 8:
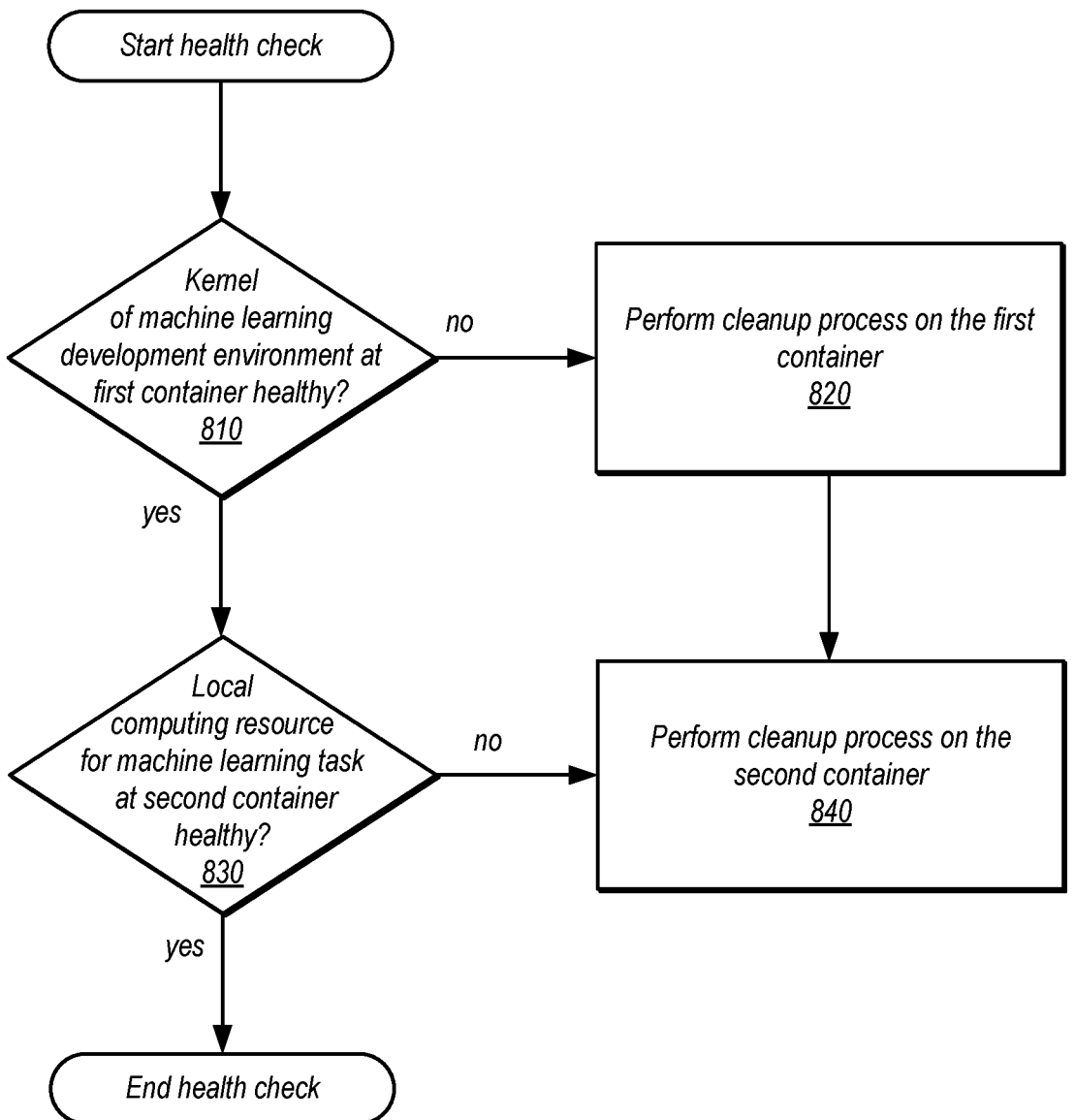
FIG. 8 is a high-level flowchart illustrating various methods and techniques for performing health checks for local computing resources, according to some embodiments.

Another type of resource management technique that may take advantage of the parent-child relationship of the local computing resource and kernel for the machine learning development environment is health checks, to shut down resources that are not healthy. A host agent or control component may perform these techniques, in some embodiments. FIG. 8 is a high-level flowchart illustrating various methods and techniques for performing health checks for local computing resources, according to some embodiments. As indicated at 810, after a health check starts, a kernel of a machine learning development environment may be evaluated for health. For example, a container virtualization management system may report status information, including whether or not a container is healthy (e.g., whether or not a container is stuck in a state, exhibiting severe performance degradation, or various other performance characteristics that degrade performance). If not healthy, then a cleanup process that deactivates, removes, and/or deletes the first container and any application data from the host system may be performed, as indicated at 820. As indicated at 840, for any child local execution resources for the kernel, a cleanup process that deactivates, removes, and/or deletes the second container implementing a local computing resource for a machine learning task and any application data from the host system may be performed, as indicated at 840.

If the kernel is healthy, a health evaluation may be still be performed for a local computing resource for a machine learning task at the second container, as indicated at 830. For example, a container virtualization management system may report status information, including whether or not a container is healthy (e.g., whether or not a container is stuck in a state, exhibiting severe performance degradation, or various other performance characteristics that degrade performance). If not healthy, then a cleanup process that deactivates, removes, and/or deletes the second container and any application data from the host system may be performed, as indicated at 840. In some embodiments, the kernel for the machine learning development environment may restart or otherwise handle the removal of the local computing resource.

Figure 9:
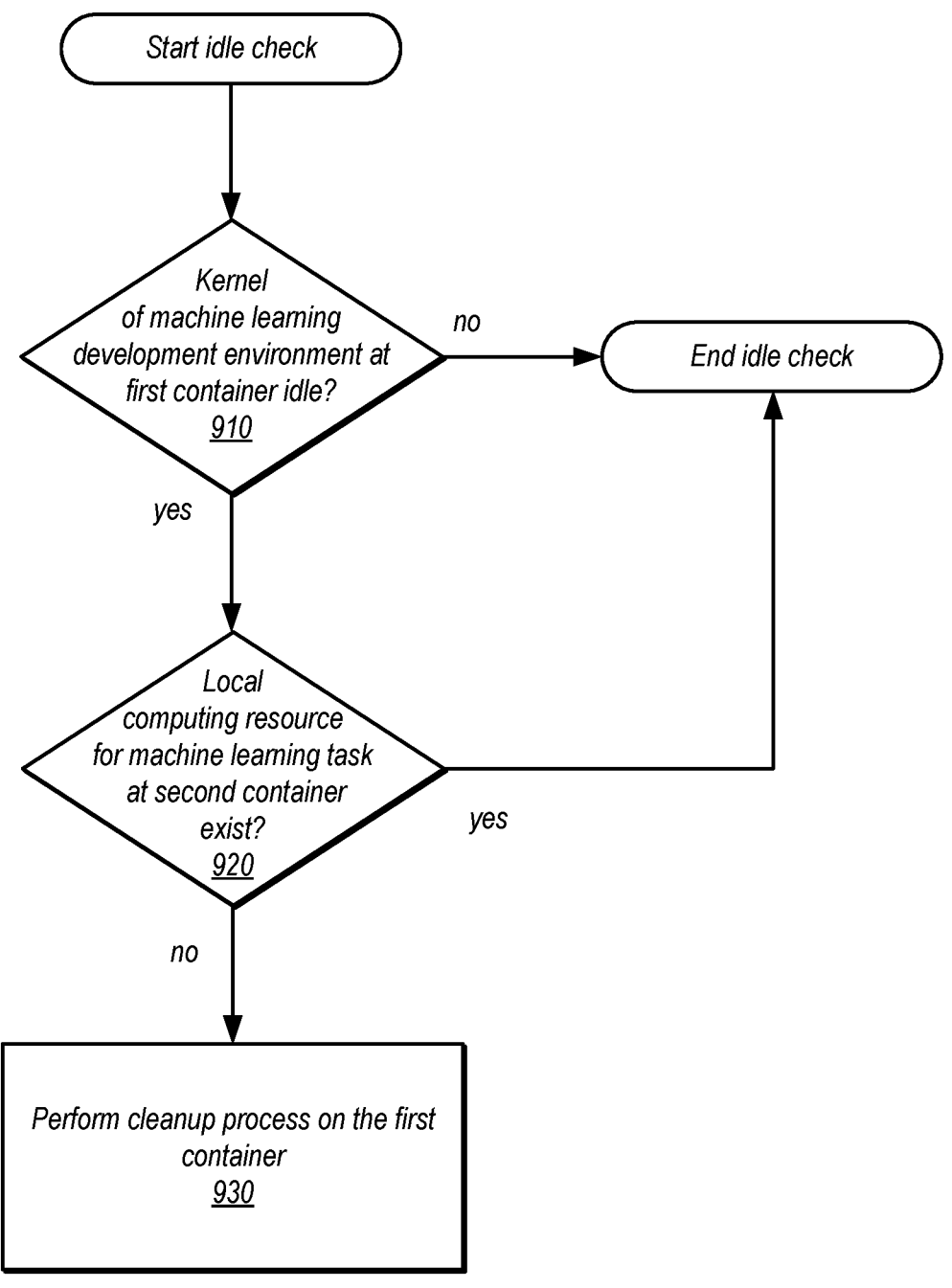
FIG. 9 is a high-level flowchart illustrating various methods and techniques for performing idle checks for local computing resources, according to some embodiments.

Another type of resource management technique that may take advantage of the parent-child relationship of the local computing resource and kernel for the machine learning development environment is idleness checks, to shut down resources that are not being used. A host agent or control component may perform these techniques, in some embodiments. FIG. 9 is a high-level flowchart illustrating various methods and techniques for performing idle checks for local computing resources, according to some embodiments. As indicated at 910, a determination may be made as to whether the kernel of the machine learning development environment at a first container is idle, in some embodiments. For example, the number of sessions open, number of kernels (more than one could be supported, and number of terminals. If below some threshold, then the kernel may be deemed idle. If not, then the idle check may end.

As indicated at 920, for an idle kernel of a machine learning environment, a determination may be made based on child associations as to whether a local computing resource for a machine learning task at a second container exists, in some embodiments. If not, then a cleanup processor to deactivate, delete, or otherwise remove the kernel of machine learning development environment may be performed, as indicated at 930. If a local computing resource does exist, then the idle check may end as local computing resource machine learning tasks may be long running and self-terminate or receive an explicit command to delete or otherwise terminate.

The methods described herein may in various embodiments be implemented by any combination of hardware and software. For example, in one embodiment, the methods may be implemented on or across one or more computer systems (e.g., a computer system as in FIG. 10) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 10:
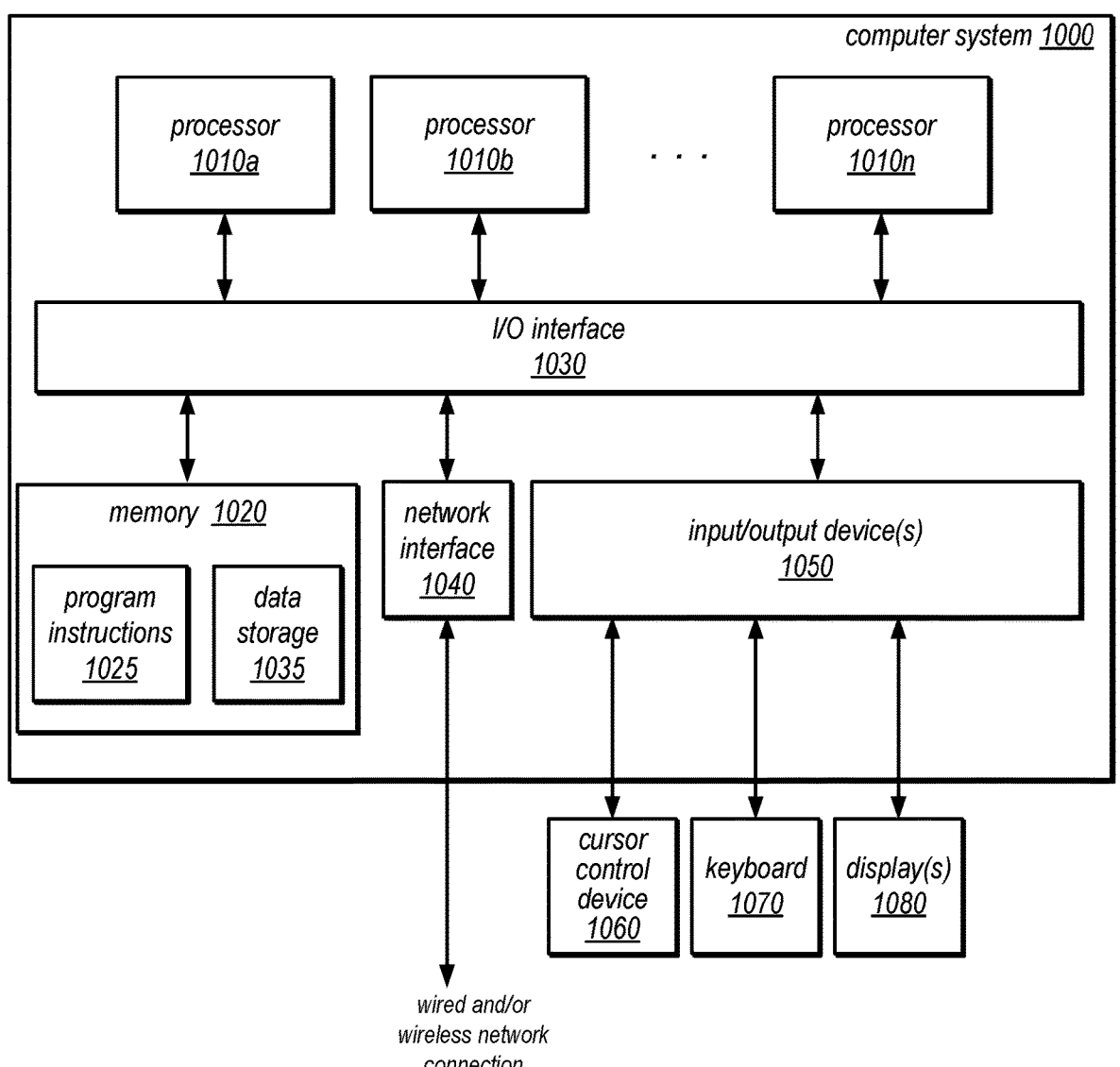
FIG. 10 illustrates an example system to implement the various methods, techniques, and systems described herein, according to some embodiments.

Embodiments of local computing resource creation for performing machine learning tasks as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86. PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to implement a host system as a virtual compute instance, configured to:
execute, by a kernel of a machine learning development environment implemented as a first container at the host system, code to perform a machine learning task, wherein the code to perform the machine learning task includes a statement that causes creation of a local execution resource at the host system to perform the machine learning task, and wherein the kernel of the machine learning development environment is accessed via a separately hosted notebook server;
wherein to create the local execution resource, the statement causes:
placement of a second container as the local execution resource at the host system as a child application of the first container;
use of a network namespace of the first container as the network namespace of the second container, making the second container able to perform network communications with the first container locally on the host system, wherein the network namespace is a local, independent network stack comprising one or more routes, one or more firewall rules, and one or more network devices specific to the network namespace; and
perform, by the second container, of the machine learning task in accordance with the code.

2. The system of claim 1, wherein the host system is further configured to perform a clean-up process to remove the second container after an auto-termination event for the second container is detected.

3. The system of claim 1, wherein the host system is further configured to determine that creation of the local computing resource is authorized based on a previously received authorization request.

4. The system of claim 1, wherein the host system and the notebook server are implemented as part of a machine learning service offered as part of a provider network, wherein the statement is implemented according to a Software Development Kit (SDK) provided by the machine learning service, and wherein the machine learning task is an inference task or a training task that uses a machine learning model.

5. A method, comprising:
executing, by a kernel of a machine learning development environment implemented as a first container at a host system, code to perform a machine learning task, wherein the code to perform the machine learning task includes a statement that causes creation of a local execution resource at the host system to perform the machine learning task;
wherein to create the local execution resource, the statement causes:
placement of a second container as the local execution resource at the host system as a child application of the first container;
use of a network namespace of the first container as the network namespace of the second container, making the second container able to perform network communications with the first container locally on the host system, wherein the network namespace is a local, independent network stack comprising one or more routes, one or more firewall rules, and one or more network devices specific to the network namespace; and
performing, by the second container, the machine learning task in accordance with the code.

6. The method of claim 5, further comprising performing a clean-up process to remove the second container after an auto-termination event for the second container is detected.

7. The method of claim 5, further comprising determining that creation of the local computing resource is authorized based on a previously received authorization request.

8. The method of claim 5, wherein the machine learning task is an inference task that uses a machine learning model to generate one or more inferences based on input data.

9. The method of claim 5, further comprising performing a clean-up process to remove the second container after a request to delete the local computing resource is sent by the kernel of the machine learning development environment.

10. The method of claim 5, wherein the second container is obtained from a container registry service, wherein the second container was provided to the container registry service via a request to register the second container for use.

11. The method of claim 5, further comprising:
determining that the kernel of the machine learning development environment is not healthy;
responsive to determining that the kernel of the machine learning development environment is not healthy:

performing a clean-up operation to remove the first container and the second container from the host system.

12. The method of claim 5, wherein a third container is placed at the at the first host system as another child application of the first container using the network namespace of the first container as the network namespace of the third container, making the third container able to perform network communications with the first container and the second container locally on the host system to provide local, distributed execution.

13. The method of claim 5, wherein the host system is implemented as part of a machine learning service that supports both local computing resources on a same host system as kernels for the machine learning development environment and other host systems for remote computing resources to perform other machine learning tasks.

14. One or more non-transitory, computer-readable storage media, storing program instructions that when executed on or across one or more computing devices cause the one or more computing devices to implement:

executing, by a kernel of a machine learning development environment implemented as a first container at a host system, code to perform a machine learning task, wherein the code to perform the machine learning task includes a statement that causes creation of a local execution resource at the host system to perform the machine learning task;

wherein to create the local execution resource, the statement causes:

placement of a second container as the local execution resource at the host system as a child application of the first container;

use of a network namespace of the first container as the network namespace of the second container, making the second container able to perform network communications with the first container locally on the host system, wherein the network namespace is a local, independent network stack comprising one or more routes, one or more firewall rules, and one or more network devices specific to the network namespace; and performance, at the second container, of the machine learning task in accordance with the code.

15. The one or more non-transitory, computer-readable storage media of claim 14, storing further program instructions that when executed by the at least one processor, cause the at least one processor to further implement performing a clean-up process to remove the second container after an auto-termination event for the second container is detected.

16. The one or more non-transitory, computer-readable storage media of claim 14, storing further program instructions that when executed by the at least one processor, cause the at least one processor to further implement determining that creation of the local computing resource is authorized based on a previously received authorization request.

17. The one or more non-transitory, computer-readable storage media of claim 14, wherein the machine learning task is a training task that trains a machine learning model using training data.

18. The one or more non-transitory, computer-readable storage media of claim 14, wherein the kernel of the machine learning development environment is accessed via a separately hosted notebook server.

19. The one or more non-transitory, computer-readable storage media of claim 14, storing further program instructions that when executed by the at least one processor, cause the at least one processor to further implement:

determining that the kernel of the machine learning development environment is not healthy;

responsive to determining that the kernel of the machine learning development environment is not healthy:

performing a clean-up operation to remove the first container and the second container from the host system.

20. The one or more non-transitory, computer-readable storage media of claim 14, wherein a third container is placed at the at the first host system as another child application of the first container using the network namespace of the first container as the network namespace of the third container, making the third container able to perform network communications with the first container and the second container locally on the host system to provide local, distributed execution.

* * * * *